United States Patent [19]

Brown et al.

[11] 4,029,870

[45] June 14, 1977

[54] TETRAFLUOROETHYLENE POLYMERS

[75] Inventors: Michael Trevenen Brown, Welwyn Garden City; William George Rodway, Welwyn, both of England

[73] Assignee: Imperial Chemical Industries Limited, London, England

[22] Filed: Mar. 24, 1975

[21] Appl. No.: 561,661

Related U.S. Application Data

[60] Division of Ser. No. 267,035, June 28, 1972, abandoned, which is a continuation-in-part of Ser. No. 111,700, Feb. 1, 1971, abandoned.

[30] Foreign Application Priority Data

Feb. 3, 1970 United Kingdom ............... 5037/70
Sept. 17, 1971 United Kingdom ............ 43436/71

[52] U.S. Cl. .................. 526/255; 204/159.2; 252/58; 260/29.6 F; 260/33.4 F; 260/33.6 F; 260/33.8 F; 260/857 TW; 260/897 C; 260/900; 528/502
[51] Int. Cl.$^2$ .................. C08F 2/46; C08F 114/26
[58] Field of Search ........ 260/92.1, 87.5 A, 87.5 B; 204/159.2; 526/255

[56] References Cited

UNITED STATES PATENTS

| | | | |
|---|---|---|---|
| 3,527,857 | 9/1970 | Fitz | 260/92.1 S |
| 3,766,031 | 10/1973 | Dillon | 204/159.2 |
| 3,878,164 | 4/1975 | Lott | 204/159.2 |

*Primary Examiner*—Harry Wong, Jr.
*Attorney, Agent, or Firm*—Cushman, Darby & Cushman

[57] ABSTRACT

Dry non-sticky fine lubricant powders are made by γ-irradiation of unsintered coagulated dispersion grade tetrafluoroethylene polymers and organic dispersions are made by dispersing the irradiated polymer in an organic medium.

3 Claims, No Drawings

TETRAFLUOROETHYLENE POLYMERS

This application is a division of U.S. application Ser. No. 267,035, filed June 28, 1972, now abandoned, which is in turn a continuation-in-part of Ser. No. 111,700 filed Feb. 1, 1971, also now abandoned.

This invention relates to tetrafluoroethylene polymers and tetrafluoroethylene polymer compositions, especially dispersions of tetrafluoroethylene polymers in organic media.

Polytetrafluoroethylene (PTFE) is well known for its low friction properties and an increasing use of PTFE is as a dry lubricant powder, for example in textile machinery. Such powders are also of use as lubricating or nucleating fillers for thermoplastics such as polyamides and polypropylene.

Heretofore lubricant powders have been made by thermal degradation of PTFE, for example by heating in air, or in the presence of a degradation accelerator, at a temperature of the order of 500°–600° C. Such thermally degraded PTFE powders may be comminuted, for example by milling, to a relatively small particle size but for some applications it would be desirable to decrease the size still further. We have not found it possible to mill thermally degraded powders to a number average particle size below 5 $\mu$m as measured optically. (The other well established technique of measurement of particle size of PTFE powders, namely the air permeability method, gives falsely low values for such thermally degraded powders and so particle sizes specified herein are those obtained by optical methods).

We have found that dry lubricant powders of submicron particle size may conveniently be made by comminution of certain types of PTFE after they have been irradiated.

According to this invention there is provided a process for the manufacture of a friable tetrafluoroethylene polymer powder characterised in that it comprises subjecting in powder form an unsintered coagulated dispersion grade of a tetrafluoroethylene polymer selected from tetrafluoroethylene homopolymers and copolymers of tetrafluoroethylene with up to 10% by weight, based on the weight of the copolymer, of an ethylenically unsaturated comonomer, to $\gamma$-radiation until it has received a dose of at least 2, e.g. from 2 to 50 and preferably from 2 to 20 M Rad. A finely divided tetrafluoroethylene polymer may then be obtained by comminuting the irradiated powder. The comminuted material has a particle size depending on the polymer treated, the radiation dose and nature of the comminution step. The number average particle size may be less than 5 $\mu$m and may be in the sub-micron range and as low as 0.3 $\mu$m and less. The invention may therefore provide a tetrafluoroethylene polymer in powder form capable of being comminuted to sub-micron particle size.

By the term "coagulated dispersion grade of a tetrafluoroethylene polymer" we mean those grades of polymer obtained by the coagulation of an agueous dispersion of polymer made by the polymerisation of tetrafluroroethylene or copolymerisation of tetrafluoroethylene with up to 10% by weight, based on the weight of the copolymer, of an ethylenically unsaturated comonomer, wherein the reactants are dispersed in an aqueous medium with the aid of an emulsifying agent which is generally highly fluorinated. The production of such dispersions is described in, inter alia, British patent specification 689 400. Examples of commercially available coagulated dispersion polymers are 'Fluon' CD1 and CD4 sold by Imperial Chemical Industries Limited and "Teflon" 6 and 6C sold by E I Du Pont de Nemours and Company.

Such coagulated dispersion polymers have a primary particle diameter of the order of 0.1 $\mu$m but as commercially available are somewhat sticky powders in the form of agglomerates having a mean diameter of the order of several hundred microns. Said powders are sticky in the sense that the powder can be compressed into a putty- or snowball-like material that can be broken into fibrous lumps. Shearing coagulated dispersion polymers in an attempt to reduce the particle size, for example by milling the powder, results in sticky fibrous products. However, by subjecting these coagulated dispersion grades of polymer to $\gamma$-irradiation as described above, the polymer is converted to a dry non-sticky fine friable powder that can easily be broken down, for example by rubbing between the fingers, to a number average particle size of less than 5 $\mu$m, and may be comminuted by suitable mechanical means to sub-micron particle size.

In contrast to coagulated dispersion polymers that have not been irradiated, shearing, for example milling, of the irradiated polymer gives a more rounded, as opposed to fibrous, particle. When it is desired to obtain a dry powder, dry milling may be employed.

The irradiation has been found to increase the bulk and packing densities of the polymer.

The coagulated dispersion polymer may be irradiated by methods well known in the art. Convenient methods include irradiation by a $Co^{60}$ source or by immersing the polymer sealed in a suitable container, for example an aluminium canister, in a spent fuel element pond.

The polymer powder should be given a radiation dose of 2 M Rads or more, preferably from 2–20 M Rads, and especially 4–10 M Rads. The use of a higher dose than 20 M Rads is likely to render the process uneconomic.

One of the uses of the irradiated polymer made by the above described method is in the formation of dispersions of tetrafluoroethylene polymer in aqueous and organic media.

While aqueous dispersions made by the method of the above mentioned British patent specification 689 400 may be used directly without further treatment, they are not suitable for all purposes. For example, because of a tendency to coagulate they cannot be concentrated sufficiently to enable them to form a thick paste to enable them to be spread by paste spreading techniques. Neither can their viscosity be increased by additives without fear of coagulation. It has been discovered that a dispersion of a tetrafluoroethylene polymer in an aqueous medium with desirable properties for certain applications may be prepared by comminuting and dispersing in water a coagulated dispersion grade of a tetrafluoroethylene polymer irradiated as above described.

A dispersion of a tetrafluoroethylene polymer in an aqueous medium may be made by subjecting an irradiated tetrafluoroethylene polymer as above described to high shear mixing in the presence of an aqueous medium to break down the particles of the polymer to sub-micron size and to form a dispersion of the polymer in the medium. In contrast with coagulated dispersion grades of tetrafluoroethylene polymers as above described the dry non-sticky fine friable powder made by the irradiation step is suitable for comminution to sub-micron size in the presence of water. Following the irradiation step, it is not necessary to comminute the polymer as this can be done in the presence of the aqueous medium, the comminution and dispersion being effected together by the high shear mixing. The high shear mixing may be performed by example by a Silverson mixer or an End Runner Mill. The aqueous dispersions made by the present invention may be used in coating applications, cosmetics, water based printing inks, greases and cutting fluids.

The irradiated polymer may also be used to make dispersion in organic media.

British Pat. Specification No. 887 750 describes the preparation of a dispersion of a wax-like product produced by polymerising tetrafluoroethylene in the presence of specified quantities of trichlorotrifluoroethane and an active telogen under specified conditions of temperature and pressure. This process is not easy to operate because of the volatility of the trichlorotrifluoroethane and is limited in scope because the resulting product is understood to include telogen and trichlorotrifluoroethane combined with tetrafluoroethylene which is not desirable for all purposes. Consequently it is advantageous to obtain organosols of PTFE by a process not involving polymerisation in an organic medium.

A further limitation of the product of the prior specification is that it comprises a wax dispersed in the residual trichlorotrifluoroethane whereas it is desirable to be able to obtain dispersions in a variety of organic liquids, not all of which would be suitable media for a tetrafluoroethylene polymerisation reaction, for example mineral oils.

From the point of view of cost and convenience, it is clearly desirable to use a dispersion grade of a tetrafluoroethylene polymer which has been manufactured in the normal way in the presence of water. However, attempts to do this in the past have been unsuccessful.

It has been discovered that by making use of an irradiated unsintered coagulated dispersion grade of a tetrafluoroethylene polymer as above described, it is possible to comminute and disperse the polymer in an organic liquid.

According to a further aspect of the invention there is provided a method of making a dispersion of a tetrafluoroethylene polymer in an organic liquid comprising subjecting an irradiated tetrafluoroethylene polymer as above described to high shear mixing in the presence of an organic liquid to break down the particles of the polymer to sub-micron size and to form a dispersion in the liquid.

Preferably the amount of liquid is regulated so that a gel-like dispersion is formed. Unlike the above described unsintered coagulated dispersion grades of tetrafluoroethylene polymers, the irradiated material is suitable for comminution to sub-micron size in the presence of the organic liquid. Comminution prior to admixture with the organic liquid is not necessary.

A suitable organic liquid in which to disperse the polymer is trichlorotrifluoroethane which is sold by Imperial Chemical Industries Limited under the Trade Mark 'Arklone' P.

The high shear mixing is for example performed by a Silverson mixer or an End Runner Mill.

The dispersions obtained may if desired by diluted with other solvents, for example non-flammable solvents such as trichloroethylene. Other solvents that may be used are alcohols, e.g. isopropanol, or further quantities of the solvent used for preparation of the dispersion.

The organic dispersions made by the present invention may be used for introducing tetrafluoroethylene polymers into oils and greases more conveniently than by use of dry powders. The dispersions may also be used as metal forming aids, e.g. as wire drawing lubricants and may be used in sintered metal processing where they can act as lubricants on compaction of the metal especially when a second compaction is being performed.

The dispersions are also useful in the application of tetrafluoroethylene polymers as coatings e.g. by aerosol, and generally in the incorporation of polymers into other liquids.

The invention will be further described by reference to the following illustrative and comparative Examples.

EXAMPLE 1

A quantity of Fluon CD1 coagulated dispersion PTFE powder was subjected to a dose of 5 M Rads of γ-irradiation. The resultant product was a friable fairly free flowing powder with a number average particle size of the order of 10–15 μm measured optically.

On fine disintegration in a light oil using bead milling or equivalent liquid dispersion techniques an extremely fine powder was obtained with a number average particle size of the order of 1–3 μm measured optically.

A polymer obtained by a thermal degradation process treated simlarly gave a product with number average particle size of the order of 5–10 μm measured optically.

EXAMPLE 2

By way of comparison a quantity of a milled granular PTFE powder sold under the name Fluon G163 was subjected to a dose of 5 M Rads of γ-irradiation. The resultant product was a friable fairly free flowing powder with a number average particle size of the order of 10–15 μm measured optically. On fine disintegration in a fluid energy mill it gave a powder with a number average particle size of the order of 5–10 μm measured optically.

A product obtained by the irradiation of Fluon CD1 coagulated dispersion polymer gives a finer powder of less than 5 μm number average particle size when treated similarly.

EXAMPLE 3

A quantity of 'Fluon' CD1 coagulated dispersion PTFE powder as sold by Imperial Chemical Industries Limited was subjected to a dose of 5 M Rad of γ-irradiation. The resultant product was a friable fairly free flowing powder with a number average particle size of the order of 10 to 15 μm measured optically.

200 gm of the irradiated polymer was added to 800 gm of water in which had been dissolved 10 gm of "Emipicol" 0045 (Trade Mark) (a sodium lauryl sulphate) and 4 gm of "Carbopol" 941 (Trade Mark) (composed of carboxyl vinyl polymers of extremely high molecular weight). The mixture was stirred by hand to form a slurry and placed in an End Runner Mill in which it was further mixed and comminuted for 5 hours. There resulted a paste-like dispersion of PTFE which remained free of supernatant liquor after 3 weks standing. The "Carbopol" is used to thicken the medium. As an alternative "Viscalex" (Trade Mark) (formed of acrylic copolymers) could be used. The PTFE particles were too small to be resolved by optical microscopy and were therefore of a particle size below 0.2 μm.

The paste is useful for coating glass cloth by knife spreading the give a thick coat (0.075–0.125 mm) in one pass instead of with several passes through a dip bath as would be necessary using orthodox PTFE dispersions of the kind previously mentioned made e.g. by the method of British patent specification 689 400 and used without further treatment.

By modifying the viscosity of the paste it is possible to form a coating on one side of the glass cloth only which is of advantage when it is necessary to stick the PTFE-coated glass cloth to another surface.

EXAMPLE 4

A quantity of Fluon CD1 coagulated dispersion PTFE powder as sold by Imperial Chemical Industries Limited was subjected to a dose of 5 M Rads of γ-irradiation. The resultant product was a friable fairly free flowing powder with a number average particle size of the order of 10 to 15 μm measured optically.

A Silverson EX mixer of three-horse power fitted with a 1/32 inch (0.0794 cm) screen is charged with 5 gallons of 'Arklone' P (36.32 kgm) and 20 lb (9.08 kgm) of the irradiated polymer. This corresponds to 20% by weight of polymer and 80% by weight of 'Arklone' P. The mixer is fitted with a standard diameter rotor and is operated for 3½minutes at 3000 rpm. The mixing should not be continued any longer under these conditions because the solvent has reached its boiling point. The polymer is found to have been dispersed in the Arklone P to form an organosol, and to have been comminuted to a particle size below 0.2 μm.

EXAMPLE 5

In this example a laboratory Silverson mixer fitted with a 0.794 cm mesh screen was used. 20% by weight of irradiated polymer similar to that described in Example 4 and 80% by weight of Arklone P were hand mixed in a beaker and then transferred into the mixer which was then operated at maximum speed (approx. 6000 rpm). Arklone P was added to make good some of the liquid losses due to evaporation. The mixer was operated for 10 minutes. There was obtained a creamy paste having approximately 40% by weight solid content, much of the Arklone having evaporated. The paste stuck to the sides of a glass bottle if shaken. No settling was observed after 3 days. The PTFE particles were to small to be resolved by optical microscopy and were therefore of a size below 0.2 μm.

We claim:

1. An unsintered coagulated dispersion grade of a tetrafluoroethylene polymer selected from (1) tetrafluoroethylene homopolymers and (2) copolymers of tetrafluoroethylene and an ethylenically unsaturated comonomer wherein the comonomer constitutes up to 10% by weight of the copolymer, said polymer having been irradiated with γ-rays and being in the form of a powder which is capable of being comminuted to a number average particle size less than 5 μm as measured optically.

2. An unsintered coagulated dispersion grade of PTFE in powder form according to claim 1 wherein the powder is capable of being comminuted to sub-micron particle size.

3. A finely divided unsintered caogulated dispersion grade tetrafluoroethylene polymer selected from (1) homopolymers of tetrafluoroethylene and (2) copolymers of tetratetrafluoroethylene and an ethylenically unsaturated comonomer wherein the comonomer constitutes up to 10% by weight of the copolymer, said polymer having been irradiated with γ-rays until it has received a dose of at least 2M Rads and and being further characterized in, having a number average particle size of less than 5 μm as measured optically.

* * * * *